Patented May 25, 1937

2,081,753

UNITED STATES PATENT OFFICE 2,081,753

COMPOSITION OF MATTER AND METHOD FOR PRODUCING

Edwin R. Littmann, Wilmington, Del., assignor to Hercules Powder Company, Wilmington, Del., a corporation of Delaware No Drawing. Application September 22, 1932, Serial No. 634,363

9 Claims. (Cl. 260—8)

This invention relates to a new composition of matter and method for its production. More particularly, this invention contemplates reaction of terpin and maleic anhydride for the production of a new composition comprising the reaction product.

More particularly, the reaction product is believed to have the empirical formula $C_{14}H_{18}O_3$. The reaction product in its crude state is found to be of a more or less resinous nature. The crude product may be readily refined and when refined will be found to be a light colored, waxy solid having crystalline properties.

In carrying out the method contemplated by this invention the maleic anhydride and terpin may be reacted under any suitable conditions. Reaction may be carried out in the presence of heat. It may be carried out in the presence of a catalyst and, if desired, an agent may be used which will aid in the removal of water of reaction from the reaction mass.

As illustrative of practical procedure, the reaction may be carried out, for example, at a temperature within say about the range 100–200° C. Where a catalyst is used, such may be any suitable catalyst and, for example, may be zinc chloride, aluminum chloride, p-toluene sulphonic acid, etc. In proceeding, maleic anhydride as such may be used or equivalently maleic acid or fumaric acid or mixtures thereof may be used in equivalent amounts, it being understood that maleic acid or fumaric acid, or mixtures thereof, will be converted into maleic anhydride.

Where it is desired to use an agent to aid in the removal of water of reaction, as such agent, for example, xylene, toluene, or the like, may be used.

The terpin and maleic anhydride will be desirably used in molar proportion. However, it will be understood that an excess of either maleic anhydride or of terpin may be used, the excess being recovered unchanged on completion of the reaction. Where maleic acid or fumaric acid, or mixtures thereof, are used, such will be used in equivalent amounts with reference to maleic anhydride. Where a catalyst is used, such may be used in amount of say ½–5% of the amount of maleic anhydride used.

As generally illustrative of procedure for the carrying out of the method embodying this invention for the production of the new composition contemplated, for example, terpin and maleic anhydride in molar proportions may be admixed and reacted in the presence of heat. If desired, a catalyst may also be used. If desired, toluene, xylene, or the like, may be included in the reaction mass to aid in removal of the water of reaction. On completion of the reaction the volatile portions of the reaction mixture are removed by steam distillation and the non-aqueous residue is then dried or dehydrated in any suitable manner, as for example, by heating or by the use of, for example, calcium chloride, sodium sulphate, or the like. If it is desired to refine the product so produced, refinement may be effected by distilling under reduced pressure, for example, by distilling at a temperature within about the range 120–160° C. under a pressure within about the range 1–5 mm. mercury.

As more specifically illustrative of the carrying out of the method in accordance with this invention, for example, a mixture of 51 parts of terpin, 29 parts of maleic anhydride and 50 parts of xylene is distilled in such manner as to remove the water formed from the reaction mass. The reaction may be carried out at a temperature of say 135–150° C. for a period of about 4½ hours. Water of reaction may be removed through use of a partial condenser from which the non-aqueous material will be returned to the reaction mass.

Following the procedure outlined in the above illustration, for example, xylene may be omitted and whether or not the xylene is omitted a catalyst may be used. If a catalyst be used, such may, for example, be zinc chloride and it may be used in the following example in amount of say about ½% of the maleic anhydride in the above example.

On completion of the reaction the volatile materials will be distilled off and the non-aqueous residue will be dried or dehydrated by heating, or by the use of sodium sulphate, or the like, and finally refined, for example, by distilling, at a temperature of say about 140° C. under a pressure of say about 1–2 mm. mercury.

The product will be found to be a light colored, waxy substance having crystalline properties and will apparently be of an acidic nature. The product will also be advantageous for use in the commercial arts.

It will be understood that from the broad standpoint this invention contemplates the reaction of terpin with maleic anhydride for the production of a new composition of matter having the empirical formula $C_{14}H_{18}O_3$ and comprising the reaction product.

It will be appreciated that the procedure detailed herein for illustrative purposes may be widely varied without departing from the scope of this invention. Thus, for example, the use of a catalyst may be omitted, as may be the use of xylene, or other agents, to remove the water of reaction.

It will be understood that by the term terpin, it is meant to include as an equivalent terpin hydrate, since under the conditions of the reaction terpin hydrate will readily change to terpin.

What I claim and desire to protect by Letters Patent is:

1. As a new composition of matter the compound having the empirical formula $C_{14}H_{18}O_3$ formed by the reaction of terpin and maleic anhydride.

2. The method of producing a new composition of matter which includes reacting components consisting of terpin and maleic anhydride.

3. The method of producing a new composition of matter which includes reacting components consisting of terpin and maleic anhydride in the presence of heat.

4. The method of producing a new composition of matter which includes reacting components consisting of terpin and maleic anhydride in the presence of heat at a temperature within the range about 100–200° C.

5. The method of producing a new composition of matter which includes reacting components consisting of terpin and maleic anhydride in the presence of heat and a catalyst selected from the group consisting of zinc chloride, aluminum chloride and p-toluene sulphonic acid.

6. The method of producing a new composition of matter which includes reacting components consisting of terpin and maleic anhydride in the presence of heat and an agent which will aid in the removal of water of reaction.

7. The method of producing a new composition of matter which includes reacting components consisting of terpin and maleic anhydride in the presence of heat while removing water of reaction.

8. The process of making a resin which consists in heating at reaction temperature a mixture of reacting proportions of terpine and a member of the group consisting of maleic anhydride and maleic acid, and after condensation is complete, distilling off the volatile impurities from the reaction product.

9. A resinous plastic material which is the condensation product of terpine and a member of the group consisting of maleic anhydride and maleic acid.

EDWIN R. LITTMANN.